United States Patent
Hozumi et al.

(10) Patent No.: US 9,033,134 B2
(45) Date of Patent: May 19, 2015

(54) BELT TRACKING SYSTEM, ROLLER ASSEMBLY, AND IMAGE FORMING APPARATUS INCLUDING SAME

(71) Applicants: Yoshiki Hozumi, Kanagawa (JP); Naomi Sugimoto, Kanagawa (JP); Kazuchika Saeki, Kanagawa (JP)

(72) Inventors: Yoshiki Hozumi, Kanagawa (JP); Naomi Sugimoto, Kanagawa (JP); Kazuchika Saeki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/140,097

(22) Filed: Dec. 24, 2013

(65) Prior Publication Data

US 2014/0209437 A1 Jul. 31, 2014

(30) Foreign Application Priority Data

Jan. 25, 2013 (JP) ................. 2013-011705
Oct. 17, 2013 (JP) ................. 2013-216398

(51) Int. Cl.
  B65G 23/44 (2006.01)
  B41J 11/00 (2006.01)
  B65G 39/16 (2006.01)
  (Continued)

(52) U.S. Cl.
  CPC .............. *B65G 23/44* (2013.01); *B41J 11/007* (2013.01); *B65G 39/16* (2013.01); *B65H 5/021* (2013.01); *B65H 2402/546* (2013.01); *B65H 2403/5331* (2013.01); *B65H 2404/253* (2013.01); *G03G 15/1615* (2013.01); *G03G 2215/00156* (2013.01); *G03G 2215/0132* (2013.01)

(58) Field of Classification Search
  CPC ........ B65G 23/44; B65G 39/16; B65G 39/071
  USPC .......... 198/806, 807, 810.03, 861.3; 399/165, 399/329
  See application file for complete search history.

(56) References Cited

U.S. PATENT DOCUMENTS 3,715,027 A * 2/1973 Fujimoto ................... 198/806
4,527,686 A * 7/1985 Satoh ......................... 198/807
(Continued)

FOREIGN PATENT DOCUMENTS

JP     6-051646    2/1994
JP     2003-195650   7/2003
(Continued)

OTHER PUBLICATIONS

U.S. Appl. No. 13/960,098, filed Aug. 6, 2013, Yoshiki Hozumi, et al.
(Continued)

*Primary Examiner* — Leslie A Nicholson, III
*Assistant Examiner* — Keith R Campbell
(74) *Attorney, Agent, or Firm* — Oblon, McClelland, Maier & Neustadt, L.L.P.

(57) ABSTRACT

A belt tracking system for adjusting displacement of a movable belt in an axial direction of a plurality of rollers about which the movable belt is entrained includes a slope member and a roller shaft support. The slope member is disposed at least at one end of at least one of the plurality of rollers in the axial direction, to tilt the roller due to movement of the belt. The roller shaft support rotates about a predetermined shaft and includes a shaft recovery member to recover a tilt of the slope member. The shaft recovery member is disposed within a shortest circumference of a closed curve among closed curves within which the slope member and the roller shaft support are disposed in a state in which the roller shaft support is rotated.

8 Claims, 13 Drawing Sheets

(51) Int. Cl.
*B65H 5/02* (2006.01)
*G03G 15/16* (2006.01)

(56) References Cited

U.S. PATENT DOCUMENTS

| | | | | |
|---|---|---|---|---|
| 5,343,279 | A * | 8/1994 | Nagata et al. | 399/329 |
| 5,896,979 | A * | 4/1999 | Hokari et al. | 198/807 |
| 7,565,095 | B2 * | 7/2009 | Mori | 399/165 |
| 7,810,633 | B2 * | 10/2010 | Okamoto et al. | 198/806 |
| 7,921,987 | B2 * | 4/2011 | Kitamura | 198/806 |
| 8,165,511 | B2 * | 4/2012 | Nakamura et al. | 399/302 |
| 8,238,793 | B2 * | 8/2012 | Nakura et al. | 399/165 |
| 8,351,831 | B2 * | 1/2013 | Hori et al. | 399/303 |
| 8,689,967 | B2 * | 4/2014 | Kitamura | 198/806 |
| 8,807,331 | B2 * | 8/2014 | Beltman et al. | 198/807 |
| 8,824,927 | B2 * | 9/2014 | Watanabe et al. | 399/122 |
| 2013/0306440 | A1 * | 11/2013 | Asaoka et al. | 198/806 |
| 2013/0306441 | A1 * | 11/2013 | Asaoka et al. | 198/806 |
| 2013/0315617 | A1 | 11/2013 | Sugiura et al. | |
| 2014/0008184 | A1 * | 1/2014 | Hozumi et al. | 198/806 |

FOREIGN PATENT DOCUMENTS

| | | |
|---|---|---|
| JP | 2009-186910 | 8/2009 |
| JP | 2009-288426 | 12/2009 |
| JP | 2010-019899 | 1/2010 |
| JP | 2010-231112 | 10/2010 |

OTHER PUBLICATIONS

U.S. Appl. No. 14/090,091, filed Nov. 26, 2013, Yoshiki Hozumi, et al.

U.S. Appl. No. 13/869,286, filed Apr. 24, 2013.

* cited by examiner

BELT TRACKING SYSTEM, ROLLER ASSEMBLY, AND IMAGE FORMING APPARATUS INCLUDING SAME

CROSS-REFERENCE TO RELATED APPLICATIONS

This patent application is based on and claims priority pursuant to 35 U.S.C. §119 from Japanese Patent Application Nos. 2013-011705, filed on Jan. 25, 2013, and 2013-216398, filed on Oct. 17, 2013, both in the Japan Patent Office, which are hereby incorporated herein by reference in their entirety.

BACKGROUND

1. Technical Field

Exemplary aspects of the present disclosure generally relate to a belt tracking system, a roller assembly, and an image forming apparatus employing the same, and more particularly, to a belt tracking system for adjusting misalignment of a movable belt in an axial direction of a plurality of rollers about which the movable belt is entrained, and a roller assembly, and an image forming apparatus employing the belt tracking system.

2. Description of the Related Art

Known image forming apparatuses employ various types of movable imaging belts, such as an intermediate transfer belt, a media conveyor belt, and a fixing belt, each of which is entrained about a plurality of generally parallel support rollers and rotated by the rotation of the rollers. Due to wear and tear of parts used to rotate the belt support rollers, the belt support rollers are no longer aligned parallel to each other. Furthermore, because multiple parts are connected, the parts vary from one to another and variation among these parts can cause a different degree of connection at the left end and the right end of the rollers. As a result, the belt support rollers are not aligned parallel.

When these rollers are no longer parallel, the belt runs over the rollers in the axial direction of the rollers, resulting in breakage of the belt.

To address this difficulty, several techniques have been proposed which employ a belt tracking system to correct the position of the belt which has drifted in the axial direction of the roller. For example, there is known a belt tracking system in which a rotary member with an inclined surface and a stationary guide member are provided to correct displacement of the belt. Such a configuration is proposed in JP-2009-288426-A.

In order to facilitate an understanding of the related art and of the novel features of the present invention, with reference to FIGS. 10A and 10B, a description is provided of a known belt tracking system to correct displacement of the belt. As illustrated in FIG. 10A, the belt tracking system includes a roller 91 about which a sheet conveyor belt 90 is entrained, rotary members 92a and 92b including inclined surfaces 93a and 93b, respectively, and stationary guide members 94a and 94b that contact the inclined surfaces 93a and 93b, respectively. FIG. 10A illustrates the sheet conveyor belt 90 without skew. As illustrated in FIG. 10A, when the sheet conveyor belt 90 is in its proper operational position without skew, the rotary members 92a and 92b at both ends in the axial direction of the roller 91 contact the stationary guide members 94a and 94b, respectively.

By contrast, as illustrated in FIG. 10B, when the sheet conveyor belt 90 drifts to one side, the belt edge contacts and presses against one of the rotary members 92a and 92b in the axial direction, causing the pressed rotary member 92a (or 92b) to move in the direction of skew of the belt 90 (in this example, the rotary member 92a is pressed to the right side of the drawing). As a result, as illustrated in FIG. 10B, the inclined surface 93a of the rotary member 92a at one axial end of the roller 91 contacts the stationary guide member 94, causing the roller 91 at that axial end to tilt downward. The end of the roller 91 at the rotary member 92a side tilts downward, thereby moving the sheet conveyor belt 90 in a direction opposite the direction of skew and hence correcting the position of the sheet conveyor belt 90.

According to JP-2009-288426-A, the end of the roller 91 at the rotary member 92a side tilts downward as described above, separating from the stationary guide member 94 as illustrated in FIG. 10C and hence hindering proper rotation of the roller 91.

To address such difficulty, in JP-2009-18691-A, a roller shaft support 96 (shown in FIG. 10D) including an elastic member 96f such as a spring or the like is provided to each of the rotary members 92a and 92b so as to exert force thereto towards the stationary guide members 94a and 94b, respectively. FIG. 10D illustrates the roller shaft support 96 provided to the belt tracking system of FIG. 10A. FIG. 11 illustrates the belt tracking system of FIG. 10D as viewed from an axial direction Z. As illustrated in FIG. 11, the known belt tracking system includes the roller shaft support 96 having a main body 96d to surround the roller 91. The main body 96d rotates about a center or hinge 96a in a direction of arrow R1 when the roller 91 and the rotary member 92a (92b) move down, thereby compressing the elastic member 96f.

In this state, the restorative force of the elastic member 96f in a direction of arrow R2 acts on the main body 96d, moving the rotary member 92a (92b) and the roller 91 in the direction of arrow R2. As a result, the rotary body 92a (92b) remains in contact with the stationary guide member 94, thereby reliably rotating the roller 91.

In another approach, JP-H06-51646 proposes rotating the roller shaft support 96 that supports a roller such as the roller 91 as illustrated in FIG. 12. By rotating the roller shaft support 96, a circumference of a circle constituted by each roller can be made significantly shorter than an inner circumference of the belt 90, thereby facilitating removal of the belt 90 from the rollers.

Although advantageous, with the belt tracking system including the roller shaft support 96 with the elastic member 96f, attachment and detachment of the belt 90 may be difficult with respect to the image forming apparatus.

FIG. 13 illustrates the roller shaft support 96 including the elastic member 96f in the known belt tracking system when the roller shaft support 96 is rotated. FIG. 14 is a perspective view schematically illustrating the known belt tracking system shown in FIG. 13. As illustrated in FIG. 13, when the roller shaft support 96 rotates about a rotary shaft 96g, the belt 90 is caught by the elastic member 96f upon removal and installation of the belt 90 as shown in FIG. 14.

SUMMARY

In view of the foregoing, in an aspect of this disclosure, there is provided an improved a belt tracking system for adjusting displacement of a movable belt in an axial direction of a plurality of rollers about which the movable belt is entrained including a slope member and a roller shaft support. The slope member is disposed at least at one end of at least one of the plurality of rollers in the axial direction, to tilt the roller due to movement of the belt. The roller shaft support rotates about a predetermined shaft and includes a shaft recovery member to recover a tilt of the slope member. The shaft recovery member is disposed within a shortest circumference of a closed curve among closed curves within which the slope member and the roller shaft support are disposed in a state in which the roller shaft support is rotated.

According to another aspect, a roller assembly for moving a movable belt includes a plurality of rollers, a slope member, and a roller shaft support. The belt is entrained about the plurality of rollers. The slope member is disposed at least at one end of at least one of the plurality of rollers in the axial direction, to tilt the roller due to movement of the belt. The roller shaft support rotates about a predetermined shaft and includes a shaft recovery member to recover a tilt of the slope member. The shaft recovery member is disposed within a shortest circumference of a closed curve among closed curves within which the slope member and the roller shaft support are disposed in a state in which the roller shaft support is rotated.

The aforementioned and other aspects, features and advantages would be more fully apparent from the following detailed description of illustrative embodiments, the accompanying drawings and the associated claims.

BRIEF DESCRIPTION OF THE SEVERAL VIEWS OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein.

DETAILED DESCRIPTION

Figure 1:
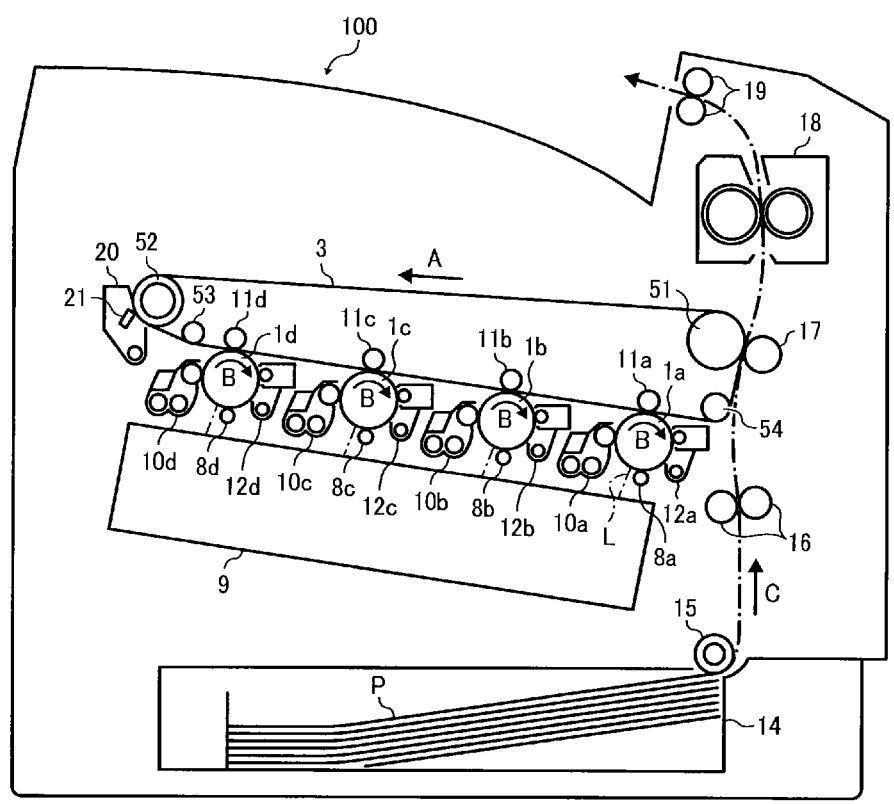
FIG. 1 is a schematic diagram illustrating an image forming apparatus according to an illustrative embodiment of the present disclosure.

A description is now given of illustrative embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of this disclosure.

In addition, it should be noted that the terminology used herein is for the purpose of describing particular embodiments only and is not intended to be limiting of this disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but include other printable media as well.

Referring now to the drawings, wherein like reference numerals designate identical or corresponding parts throughout the several views, exemplary embodiments of the present patent application are described.

With reference to FIGS. 1 through 9, a description is provided of illustrative embodiments of the present disclosure. FIG. 1 is a schematic diagram illustrating an example of an image forming apparatus according to an illustrative embodiment of the present disclosure. As shown in FIG. 1, an image forming apparatus 100 includes a tandem color printer that employs four imaging stations, including first through fourth photosensitive drums 1a, 1b, 1c, and 1d arranged in tandem, for forming toner images with four different colors: black, magenta, cyan, and yellow. Since the imaging stations have the same configuration as all the others differing in the color of toner used for image formation, features of the photosensitive member and its associated imaging equipment described herein apply to all the imaging stations unless otherwise indicated.

Also included in the image forming apparatus 100 is an intermediate transfer device including an intermediate transfer belt 3 disposed opposite and in contact with the photosensitive members 1a, 1b, 1c, and 1d. The intermediate transfer belt 3 is entrained about a plurality of belt support rollers, including a drive roller 51 and a tension roller 52, as well as support rollers 53 and 54, aligned generally parallel to each other.

As the drive roller 51 driven by a driving source rotates, the intermediate transfer belt 3 rotates in a direction indicated by arrow A. In the present illustrative embodiment, the intermediate transfer belt 3 comprises a looped belt composed of one or more layers of material. In the case of a single-layer belt, the belt material may be selected from, for example, polyvinylidene difluoride (PVDF), polycarbonate (PC) and polyimide (PI). In the case of a multi-layered belt, the belt may be formed of a relatively inelastic fluorine resin such as a PVDF sheet and polyimide resin, with a smooth coating of fluorine resin deposited on the substrate.

The photosensitive members 1a, 1b, 1c, and 1d, and associated imaging equipment to form toner images thereon and to transfer the toner images onto the intermediate transfer belt 3 have the same configuration as all the others, differing only in the color of toner employed. Thus, a description is provided only of the first photosensitive member 1a and its associated imaging equipment for forming a toner image of black as an example of the photosensitive members and associated imaging equipment. The second through fourth photosensitive members 1b, 1c, and 1d, and associated imaging equipment are omitted herein, unless otherwise indicated.

The photosensitive member 1a is rotatable in a direction indicated by arrow B, while surrounded by various pieces of imaging equipment, including a charge neutralizer, a charging device 8a, a development device 10a, and a cleaning device 12a. While the photosensitive member 1a is rotated in the direction of arrow B, light from the charge neutralizer illuminates the surface of the photosensitive member 1a, thereby initializing the surface potential of the photosensitive member 1a. The charging device 8a is disposed near the photosensitive member 1a and charges uniformly the surface of the photosensitive member 1a, the surface potential of which has been initialized, to a negative polarity. Subsequently, an exposure device 9 illuminates the photosensitive surface with a laser beam L, thereby forming an electrostatic latent image on the surface of the photosensitive member 1a.

The developing device 10a develops the electrostatic latent image formed on the photosensitive drum 1a with black toner, thereby developing the electrostatic latent image into a visible image, known as a toner image of black. Four primary transfer rollers 11a, 11b, 11c, and 11d are disposed opposite the photosensitive members 1a, 1b, 1c, and 1d, respectively, via the intermediate transfer belt 3 to form four primary transfer nips therebetween, through each of which the toner image is primarily transferred from the photosensitive member to the intermediate transfer belt 3.

At the primary transfer nip, the primary transfer roller 11a is supplied with a bias voltage (transfer voltage) having a polarity opposite that of the charged toner on the photosensitive member 1a (for example, a transfer voltage having a positive polarity where the charged toner has a negative polarity), thereby forming a transfer electric field between the photosensitive member 1a and the intermediate transfer belt 3. This electrostatically transfers the toner image from the photosensitive member 1a to an outer surface of the belt 3 which rotates in sync with the movement of the photosensitive member 1a in a process known as primary transfer. After the primary transfer, the surface of the photosensitive member 1a enters the cleaning device 12a to remove residual toner remaining on the surface of the photosensitive member 1a.

Similarly, toner images of magenta, cyan, and yellow are formed on the second through fourth photosensitive members 1b through 1d. Subsequently, the toner images are transferred electrostatically onto the black toner image which has been transferred on the intermediate transfer belt 3 such that they are superimposed one atop the other to form a composite toner image on the surface of the intermediate transfer belt 3.

A sheet tray 14 accommodating a stack of recording sheets P is disposed at the bottom of the image forming apparatus 100. A feed roller 15 is disposed at an outlet of the sheet tray 14 to feed the recording sheet P in a direction indicated by arrow C into a sheet conveyance path defined by a suitable sheet conveyance device, including, for example, a movable belt entrained around a plurality of belt support rollers. Along the sheet conveyance path is a pair of registration rollers 16 for introducing the recording sheet P into a secondary transfer nip between a secondary transfer roller 17 and the outer surface of the intermediate transfer belt 3.

The secondary transfer roller 17 is disposed opposite a drive roller 51 via the intermediate transfer belt 3 to form the secondary transfer nip therebetween, through which the toner image is secondarily transferred from the intermediate transfer belt 3 to a recording sheet P. The secondary transfer roller 17 is supplied with a predetermined bias voltage (secondary transfer voltage) to transfer secondarily the toner image from the intermediate transfer belt 3 onto the recording sheet P.

A fixing device 18 is disposed downstream from the secondary transfer nip to fix the toner image on the recording sheet P with heat and pressure applied thereto. Thereafter, the recording sheet P is output by a pair of output rollers 19 for stacking the recording sheet P outside the apparatus body. A belt cleaning device 20 removes residual toner remaining on the intermediate transfer belt 3 after secondary transfer of the toner image. In the present illustrative embodiment, the belt cleaning device 20 includes a cleaning blade 21 of suitable material, such as urethane, held against the intermediate transfer belt 3 to mechanically remove or scrape toner residues from the belt surface.

Alternatively, instead of or in combination with a cleaning blade, any suitable cleaning device may be used to clean the intermediate transfer belt 3, including, for example, an electrostatic cleaning device that incorporates an electrically conductive fur brush for electrostatically removing toner residues from the belt surface.

A description is now given of a belt tracking system 50 employed in the image forming apparatus 100 according to an illustrative embodiment of the present disclosure. According to the present illustrative embodiment, the belt tacking system 50 is provided to at least one of the plurality of rollers employed in the image forming apparatus 100 shown in FIG. 1. In the following example, the belt tracking system 50 is provided to the tension roller 52. However, unless otherwise specified, the belt tracking system 50 can be provided to at least one of the drive roller 51, the support rollers 53 and 54.

Figure 2A:
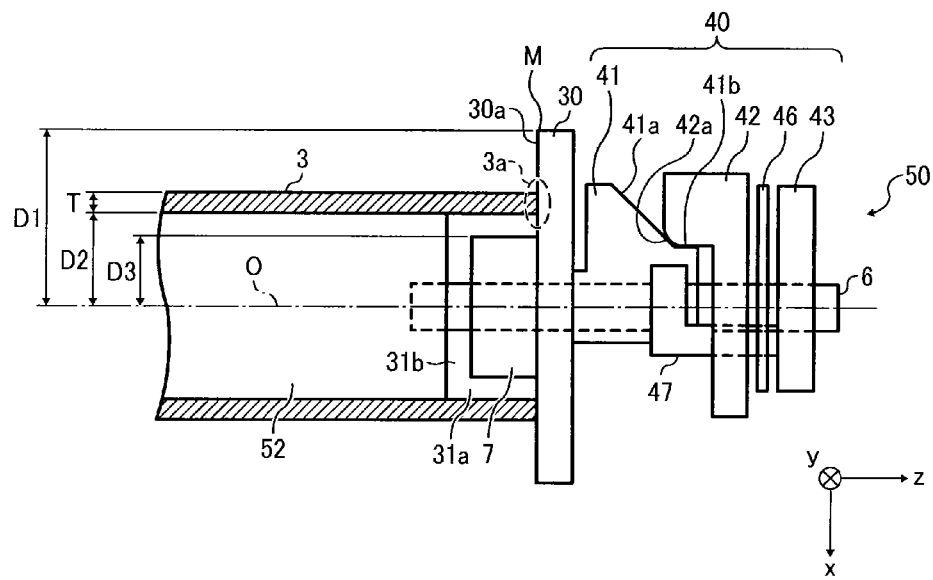
FIGS. 2A and 2B are cross-sectional views schematically illustrating a belt tracking system according to an illustrative embodiment of the present disclosure.
Figure 2B:
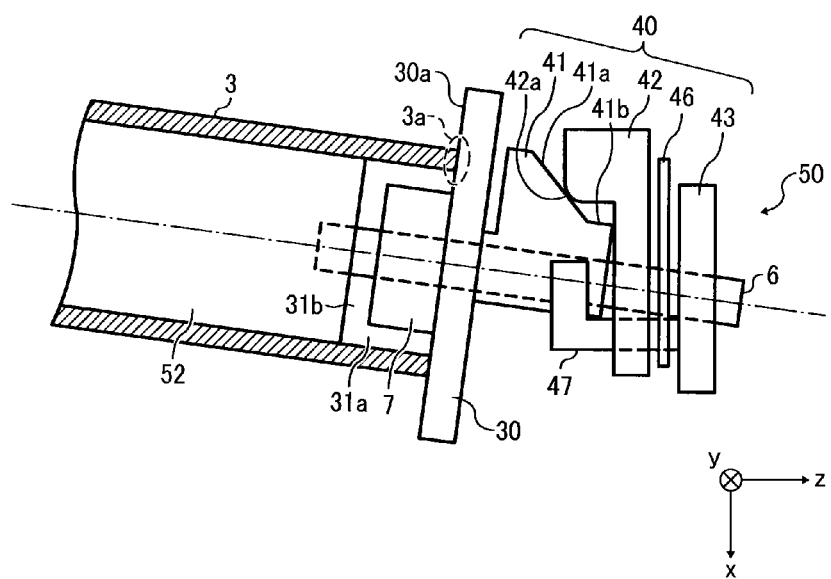

FIGS. 2A and 2B are cross-sectional views of the belt tracking system 50 according to an illustrative embodiment of the present disclosure.

As illustrated in FIG. 2A, the belt tracking system 50 includes a contact member 30 and a position adjuster 40. The position adjuster 40 includes a slope member 41, a shaft guide 42, and a roller shaft support 43. The tension roller 52, a roller shaft 6, the contact member 30, and the position adjuster 40 constitute a roller unit.

As illustrated in FIG. 2A, the belt tracking system 50 includes the roller shaft 6. In the present illustrative embodiment, the roller shaft 6 includes a cylindrical body with a diameter smaller than that of the tension roller 52. The roller shaft 6 is disposed at the end of the tension roller 52 and is coaxially mounted with the roller 52 to integrally rotate with the tension roller 52. The roller shaft 6 penetrates movably through the contact member 30 and the position adjuster 40. More specifically, the slope member 41 of the position adjuster 40 and the contact member 30 can move freely in an axial direction of the tension roller 52 indicated by arrow Z (thereafter, it may be referred to as "axial direction of the roller") in FIG. 2A while moving such that the contact member 30 and the slope member 41 are movable in association with the roller shaft 6 generally in the direction perpendicular to the axial direction of the roller.

The contact member 30 is disposed movably at the end of the tension roller 52 in the axial direction of the roller. The contact member 30 includes a generally planar, flat surface 30a with a circular peripheral shape concentric with the rotational axis of the tension roller 52. The flat surface 30a extends substantially perpendicular to the axial direction thereof. The flat surface 30a comes into contact with a belt end portion 3a of the intermediate transfer belt 3 when the intermediate transfer belt 3 moves outward in the axial direction Z from the axial end of the tension roller 52.

As illustrated in FIG. 2A, in order to prevent displacement of the intermediate transfer belt 3 in which the belt end portion 3a strikes the flat surface 30a of the contact member 30 and the intermediate transfer belt 3 runs over the contact member 30, slipping off from the tension roller 52, a radius D1 of the circular peripheral shape of the flat surface 30a exceeds a sum of a radius D2 of the tension roller 52 and a thickness T of the intermediate transfer belt 3. For example, where the assembly is constructed with the roller radius D2 of 8.78 mm and the belt thickness T of 80 μm, the distance D1 (which is the radius of the circular peripheral shape of the flat surface 30a in the present illustrative embodiment) may be set to a range greater than 8.86 mm, such as approximately 9.00 mm.

Alternatively, as long as the contact member 30 properly serves its intended function, the flat surface 30a includes any generally planar surface, including a curved surface, an irregular surface, or any combination thereof. Further, the peripheral shape of the flat surface 30a includes any closed curves, such as a circle, an ellipse, a rectangle, a polygon, or any combination thereof. The flat surface 30a may be shaped and dimensioned such that the radius D1 between a central, rotational axis O of the tension roller 52 and a periphery M of the flat surface 30a exceeds a sum of the radius D2 of the tension roller 52 and the thickness T of the intermediate transfer belt 3.

The contact member 30 is supported on the roller shaft 6 loosely, that is, without being fastened to the roller shaft 6 and the tension roller 52. Thus, the contact member 30 freely rotates around the same axis as the axis of the tension roller 52 in the XY plane as illustrated in FIG. 2A. In this configuration, when the intermediate transfer belt 3 rotates while the belt end portion 3a of the intermediate transfer belt 3 contacts the flat surface 30a of the contact member 30, the contact member 30 gets rotated due to frictional force between the contact member 30 and the belt end portion 3a.

As illustrated in FIGS. 2A and 2B, the belt tracking system 50 further includes a belt end support 7 interposed between the axial end of the tension roller 52 and the contact member 30 to prevent the belt end portion 3a from sagging down, for example, due to gravity when the belt end portion 3a separates from the contact member 30. More specifically, in the present illustrative embodiment, the belt end support 7 is formed of an annular cylinder coaxially mounted on the axis of the tension roller 52. The belt end support 7 has a radius D3 smaller than the radius D2 of the tension roller 52 to create a gap 31a between the adjacent surface of the intermediate transfer belt 3 and the belt end support 7. It is to be noted that the belt end support 7 may be configured in any suitable regular or irregular geometric shape, including not only cylinders, but also spheres, cubes, and other polygonal prisms, which properly serves its intended function.

Figure 3:
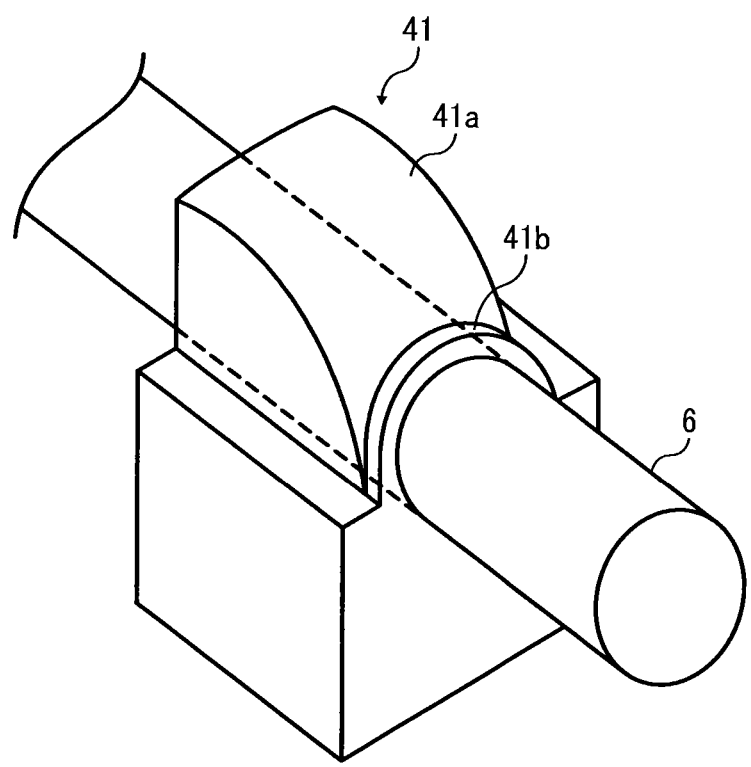
FIG. 3 is a perspective view schematically illustrating a slope member employed in the belt tracking system of FIG. 2A.

As illustrated in FIG. 2A, the slope member 41 is disposed outside and in contact with the contact member 30 in the axial direction Z. In other words, the slope member 41 is disposed at the opposite side to the tension roller 52 via the contact member 30. The slope member 41 includes a planar inclined surface 41a sloping down to the roller shaft 6 outward in the axial direction Z relative to the surface parallel to the belt surface. As illustrated in FIG. 3, the inclined surface 41a of the slope member 41 may be shaped into a spherical surface or a curved surface. Examples of the inclined surface 41a include, but are not limited to, a conical surface, a cylindrical surface, a spherical surface, and combinations thereof, which allow the inclined surface 41 a to point-contact a guide surface 42a of a shaft guide 42.

Figure 15:
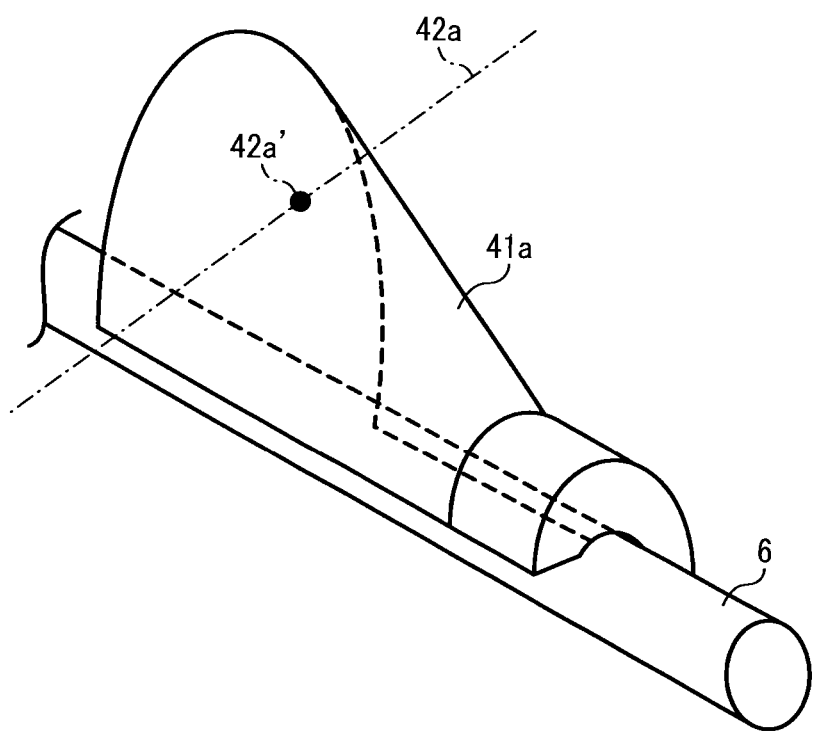
FIG. 15 is a schematic diagram illustrating another example of the slope member.

FIG. 15 illustrates an example of the inclined surface 41a having a conical surface with its vertex located on the roller axis. As illustrated in FIG. 15, the inclined surface 41a may be shaped into a conical surface with its vertex located on the roller axis. Such a configuration maintains a constant angle or orientation at which the slope member 41 contacts the shaft guide 42 during movement of the tension roller 52 and also reduces an area of contact with the shaft guide 42, hence reducing friction relative to the shaft guide 42. Accordingly, the slope member 41 slopes smoothly, thereby reducing loads on the belt end portion 3a and the degree and the area of abrasion.

As illustrated in FIG. 3, the slope member 41 includes an inclination stopper 41b disposed substantially at the outward end portion of the inclined surface 41a in the axial direction of the roller. As illustrated in FIG. 3, the inclination stopper 41b is constituted of a portion of a cylinder body concentric with the central axis of the roller shaft 6.

The inclined surface 41a and the inclination stopper 41b are made of material having a relatively low friction coefficient, such as polyacetal which exhibits relatively high wear resistance. In order to prevent excessive load applied to the guide surface 42a by the inclined surface 41a, preferably, the inclination angle of the inclined surface 41a relative to the roller shaft 6 is small. However, too small an inclination angle would result in a large amount of displacement experienced by the slope member 41 for tilting the roller shaft 6, necessitating a relatively large space to accommodate axial displacement of the slope member 41, adding to the overall size of the belt assembly. The inclined surface 41 a is angled at a suitable inclination angle of, for example, approximately 30 degrees relative to the roller shaft 6.

Referring back to FIG. 2A, the belt tracking system 50 includes the shaft guide 42 disposed outside and in contact with the slope member 41. In other words, the shaft guide 42 is disposed outside the slope member 41 relative to the tension roller 52 in the axial direction Z. The guide surface 42a of the shaft guide 42 contacts the inclined surface 41a. The shaft guide 42 is fastened so that the shaft guide 42 does not move upon displacement of the slidable member 41. With this configuration, as the slope member 41 moves outward in the axial direction Z of the roller, the inclined surface 41a contacting the guide surface 42a shifts upward, causing the slope member 41 and the roller shaft 6 to tilt. As the roller shaft 6 tilts, the tension roller 52 joined with the roller shaft 6 tilts as well.

Preferably, the guide surface 42a is shaped into a chamfered surface and forms a circular arc in the XZ plane, which is a portion of a cylinder surface. Compared to a sharp cornered edge, the guide surface 42a is superior in preventing abrasion on the inclined surface 41a of the slope member 41.

Because the inclination stopper 41b of the slope member 41 comes into contact with the shaft guide 42, the slope member 41 does not move in the direction of –X axis direction when the belt end portion 3a does not exert force in the axial direction of the roller. Similarly, the slope member 41 provided to the other end of the tension roller 52 does not move in the –X axis direction. Accordingly, with the belt tracking system 50, the tension roller 52 is reliably positioned substantially parallel to the Z axis direction (at a predetermined position) as illustrated in FIG. 2A.

During operation, if the tension roller 52 is not parallel to the Z axis direction, the intermediate transfer belt 3 moves in the axial direction of the roller. As the intermediate transfer belt 3 moves in the axial direction of the roller and strikes the contact member 30, the slope member 41 tilts, causing the tension roller 52 to tilt as well. Accordingly, the intermediate transfer belt 3 returns back to its original position. At this time, in a case in which the tension roller 52 is disposed at the predetermined place at which the tension roller 52 is substantially parallel to the axial direction Z, it does not take long for the tension roller 52 to reach the desired inclination to bring the intermediate transfer belt 3 back to its original position.

By contrast, in a case in which the slope member 41 is not disposed at the predetermined place and the tension roller 52 is tilted, it takes a significant amount of time for the tension roller 52 to reach the desired inclination to bring the intermediate transfer belt 3 back to the original position. If, in the meantime, the image is formed on the intermediate transfer belt 3, the toner images are not transferred properly one atop the other, resulting in color drift.

Figure 4:
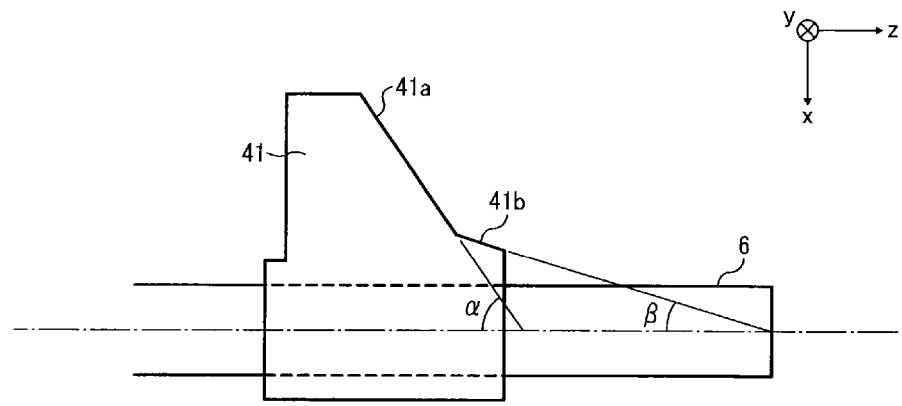
FIG. 4 is a cross-sectional view schematically illustrating another example of the slope member.

With reference to FIG. 4, a description is provided of another example of the slope member 41. In the present illustrative embodiment, the inclination stopper 41b of the slope member 41 is modified. As described above, the inclination stopper 41b shown in FIG. 3 is constituted of a portion of a cylinder concentric with the central axis of the roller shaft 6. By contrast, the inclination stopper 41b shown in FIG. 4 is disposed such that an angle p is formed between the roller shaft 6 and the surface of the cylinder constituting the inclination stopper 41b. In this configuration, the angle β is less than a predetermined angle a between the roller shaft 6 and the surface of the cylinder constituting the inclined surface 41a. With the inclination stopper 41b, the tension roller 52 and the support roller 53 are reliably maintained parallel to each other as compared with the configuration without the inclination stopper 41b.

Figure 5:
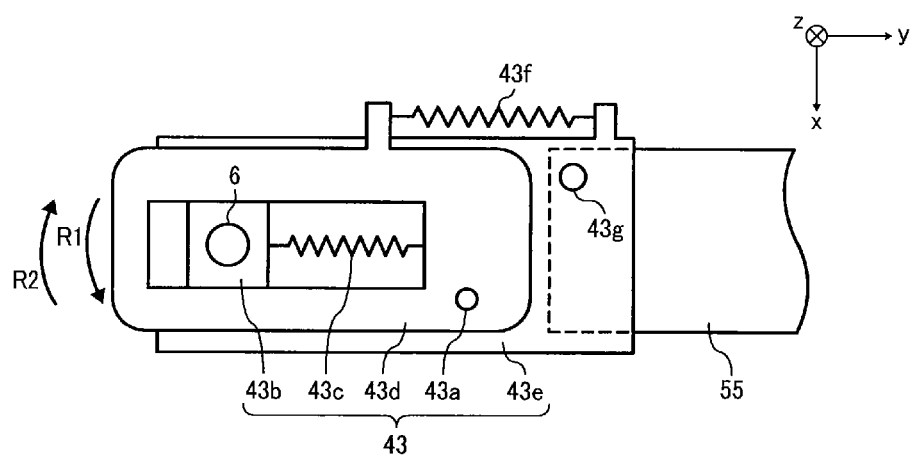
FIG. 5 is a schematic diagram illustrating a roller shaft support employed in the belt tracking system according to an illustrative embodiment of the present disclosure.
Figure 6:
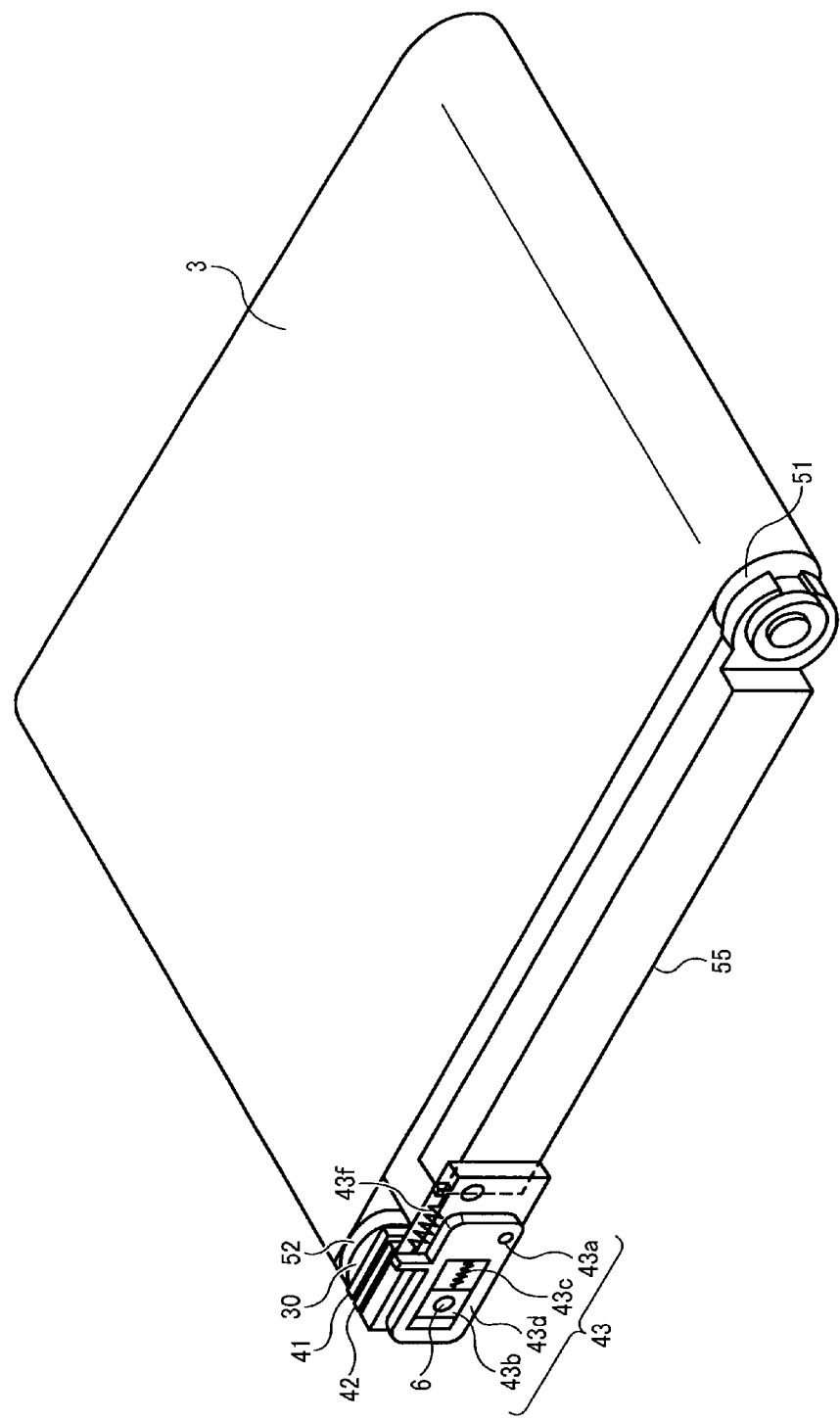
FIG. 6 is a perspective view schematically illustrating a drive roller, a tension roller, and the belt tracking system.
Figure 7:
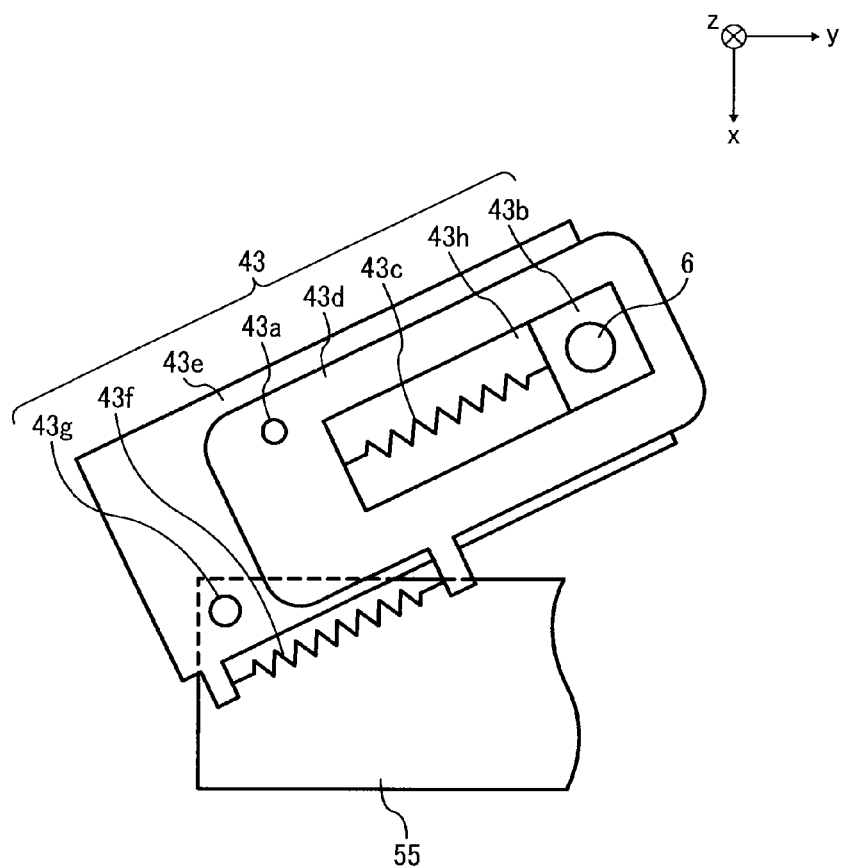
FIG. 7 is a schematic diagram illustrating the roller shaft support of FIG. 5 after the roller shaft support is rotated.
Figure 8:
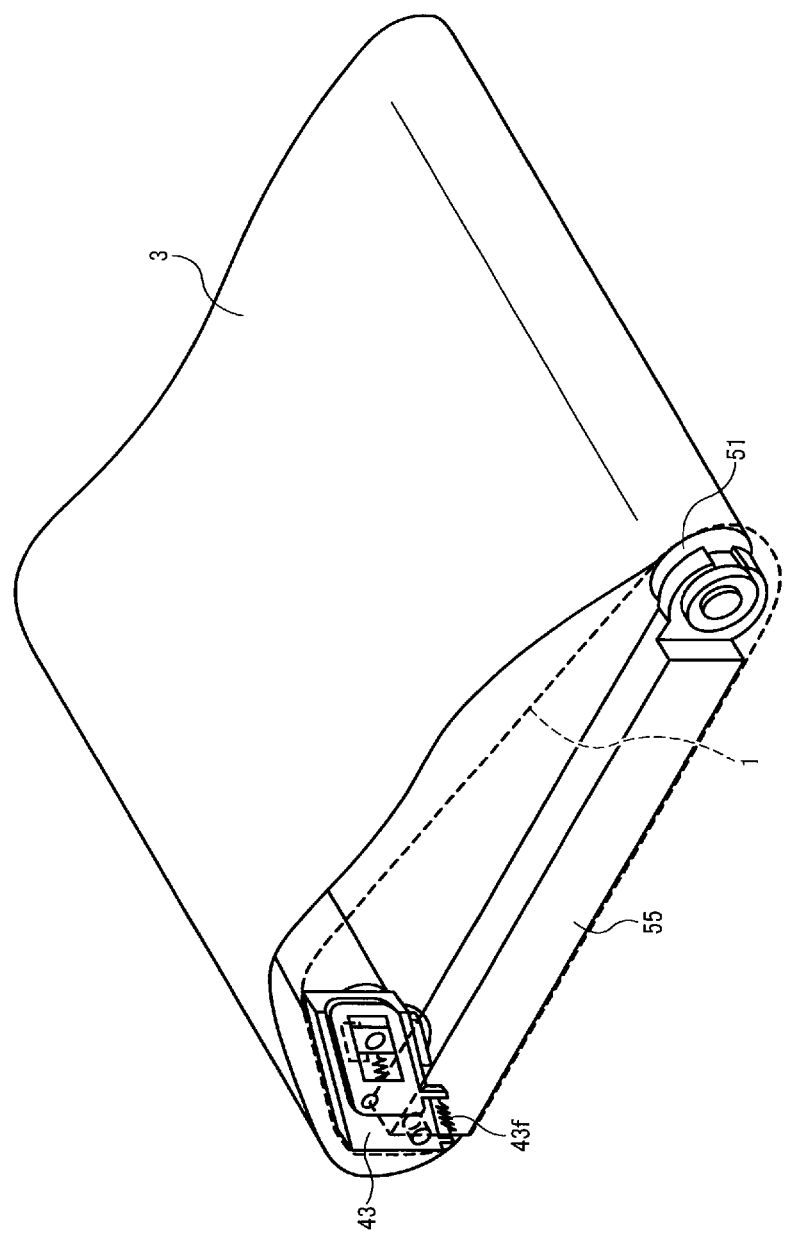
FIG. 8 is a perspective view schematically illustrating the drive roller, the tension roller, and the belt tracking system after the roller shaft support is rotated.

As illustrated in FIG. 2A, according to the present illustrative embodiment, the belt tracking system 50 includes the roller shaft support 43 disposed outside the guide member 42 in the axial direction or the Z direction. With reference to FIGS. 5 through 8, a description is provided of the roller shaft support 43. FIG. 5 is a schematic diagram illustrating the roller shaft support 43 according to an illustrative embodiment of the present disclosure. FIG. 6 is a schematic perspective view illustrating the drive roller 51, the tension roller 52, and the belt tracking system 50. FIG. 7 illustrates the roller shaft support 43 after the roller shaft support 43 is rotated. FIG. 8 illustrates the drive roller 51, the tension roller 52, and the belt tracking system 50 after the roller shaft support 43 is rotated.

The roller shaft support 43 applies force to the roller shaft 6 in a direction opposite the direction of inclination. As illustrated in FIG. 5, the roller shaft support 43 includes a hinge or pivot 43a, a tension roller adjuster 43b, an elastic member 43c, a first plate 43d, a second plate 43e, an elastic member 43f, and a rotary shaft 43g.

The first plate 43d rotates about the hinge or the pivot 43a in a first direction indicated by arrow R1 as the roller shaft 6 moves in the direction perpendicular to the axial direction Z. The elastic member 43f, for example, a spring, connects the first plate 43d and the stationary second plate 43e which does not move along with movement of the roller shaft 6. When the first plate 43d rotates in the first direction R1, the elastic member 43f stretches. With the stretch of the elastic member 43f, the resultant elastic force, which opposes the change in length of the elastic member 43f, causes the first plate 43d to rotate backward in a second rotational direction R2 opposite the first direction R1 around the hinge or pivot 43a. Accordingly, a force in the axial direction –X acts on the roller shaft 6, pushing the slope member 41 against the shaft guide member 42.

The elastic member 43f serves as a shaft moving member to move the roller shaft 6 in the direction opposite the direction of inclination.

The roller shaft 6 penetrates through the tension roller adjuster 43b. The elastic member 43c connects the first plate 43d and the tension roller adjuster 43b, thereby enabling the tension roller adjuster 43b to move in the direction of stretch of the elastic member 43c. The tension roller adjuster 43b moves in conjunction with movement of the first plate 43d in the directions R1 and R2.

The elastic member 43c applies an elastic force to the roller shaft 6 in such a direction that the tension roller 52 separates from the drive roller 51. With this configuration, the intermediate transfer belt 3 entrained around the tension roller 52 is kept stretched.

According to the present illustrative embodiment, the tension roller adjuster 43b supporting the roller shaft 6 as illustrated in FIG. 5 is pressed by the elastic member 43c, thereby keeping the intermediate transfer belt 3 stretched. The roller shaft support 43 includes a guide hole 43h. The guide hole 43h, within which the tension roller adjuster 43b moves, has a size to keep an intermediate transfer belt 3 with a maximum circumferential length stretched. It is to be noted that the guide hole 43h is an example of a tension roller guide.

As illustrated in FIGS. 5 and 6, the second plate 43e is disposed to overlap with a portion of a lateral plate 55 and is fastened to the lateral plate 55 with a screw or the like when the apparatus is in operation. By removing the screw or the like that fastens the second plate 43e to the lateral plate 55, the roller shaft support 43 can rotate about the rotary shaft 43g as illustrated in FIGS. 7 and 8. The roller shaft 6 penetrating through the roller shaft support 43 and the tension roller 52 joined with the roller shaft 6 rotate in association with rotation of the roller shaft support 43.

Accordingly, the tension roller adjuster 43b strikes the end of the guide hole 43h and is positioned in place. When the tension roller adjuster 43b is at this position, the intermediate transfer belt 3 is stretched more than when the intermediate transfer belt 3 is stretched before the roller shaft support 43 is rotated. The size of the guide hole 43h is configured such that the shortest circumference of a closed curve 1 (indicated by a broken line in FIG. 8) among closed curves within which all devices of the roller unit are included is shorter than the inner circumferential length of the intermediate transfer belt 3. This configuration facilitates attachment and detachment of the intermediate transfer belt 3 and maintains the intermediate transfer belt 3 stretched.

The elastic member 43f is disposed on the lateral surface of the roller shaft support 43 in the direction of rotation thereof. As the roller shaft support 43 rotates, the elastic member 43f comes inside the roller unit as illustrated in FIG. 8. In a state in which the roller shaft support 43 is rotated as illustrated in FIG. 8, the closed curve having the shortest circumference (the closed curve 1 in FIG. 8) among the closed curves within which all devices of the roller unit are included is shorter than the inner circumferential length of the intermediate transfer belt 3 so that it does not hinder attachment and detachment of the intermediate transfer belt 3.

In a state in which the roller shaft support 43 is not rotated as illustrated in FIGS. 5 and 6, the elastic member 43f is disposed such that the direction of stretch and compression thereof is horizontal. In this configuration, even when the roller shaft support 43 is rotated as illustrated in FIGS. 7 and 8, the elastic member 43f does not strike other parts and stop rotation. According to the present illustrative embodiment, the elastic member 43f may employ a spring as an example of the elastic member. In stead of a spring, an elastic member such as a leaf spring and rubber may be employed.

Next, a description is provided of operation of the belt tracking system 50 according to an illustrative embodiment of the present disclosure. As the drive roller 51 is rotated by the drive source, the rotation of the drive roller 51 causes the intermediate transfer belt 3 to rotate in the direction of arrow Y (hereinafter referred to as traveling direction) shown in FIG. 2A. The tension roller 52 about which the intermediate transfer belt 3 is entrained is rotated in conjunction with rotation of the intermediate transfer belt 3. At this time, the intermediate transfer belt 3 may drift in the axial direction of the roller when the plurality of rollers is not parallel to each other. As the intermediate transfer belt 3 moves in the axial direction and the belt end portion 3a strikes the flat surface 30a, the intermediate transfer belt 3 moves in its traveling direction while the belt end portion 3a keeps forcing the contact member 30 outward in the axial direction.

With reference to FIGS. 2A and 2B, and 9A and 9B, a description is provided of the movement of the intermediate transfer belt 3 in the axial direction. For simplicity, the movement of the intermediate transfer belt 3 is explained with respect to the tension roller 52 and the support roller 53 around which the intermediate transfer belt 3 is entrained.

Figure 9A:
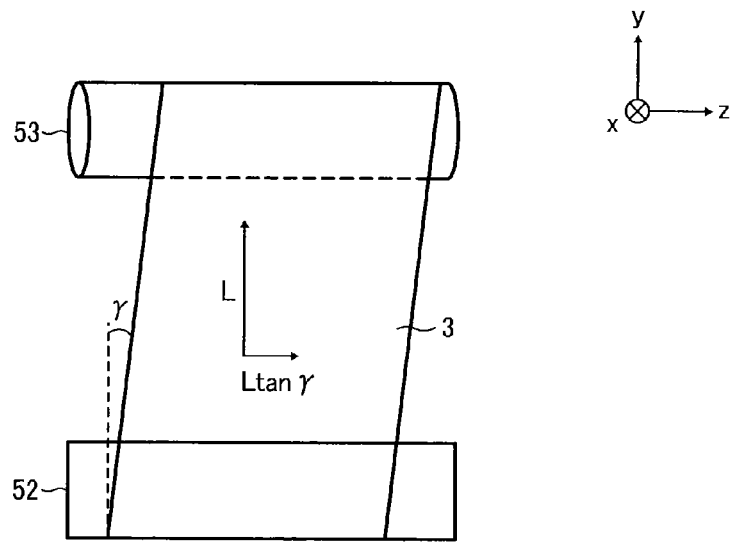
FIGS. 9A and 9B are schematic plan views illustrating a belt entrained around rollers.
Figure 9B:
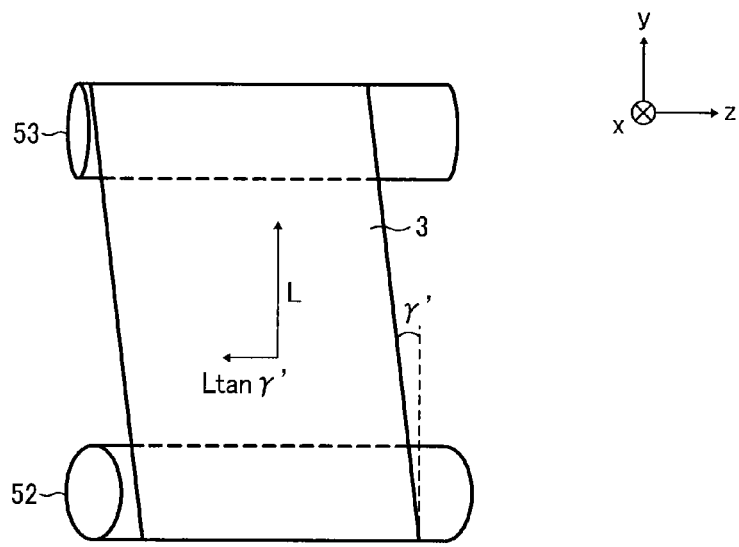
Figure 10A:
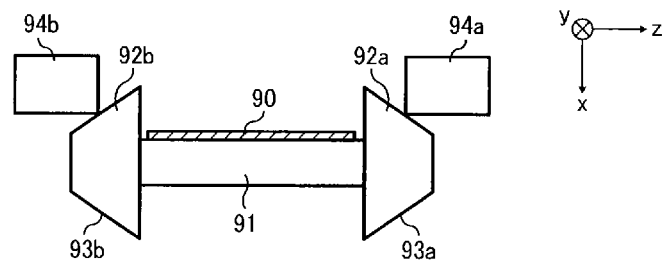
FIGS. 10A through 10D are schematic diagrams schematically illustrating a related-art belt tracking system.
Figure 10B:
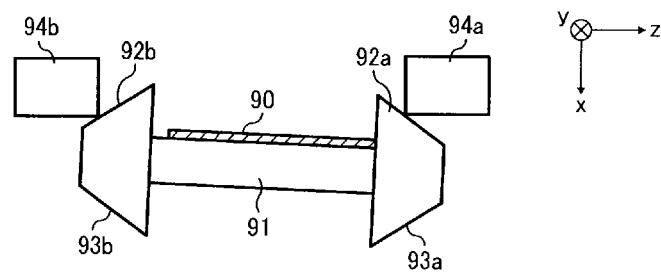
Figure 10C:
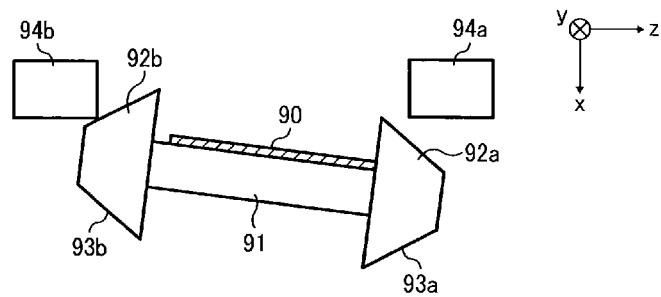
Figure 10D:
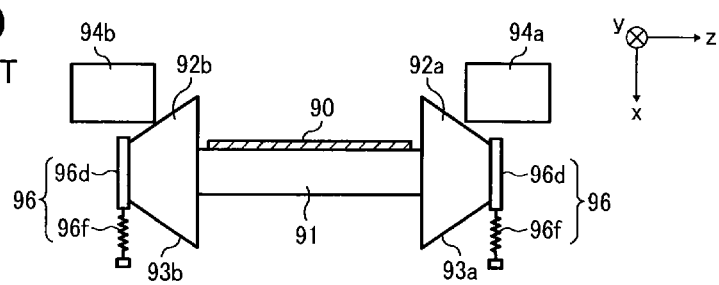
Figure 11:
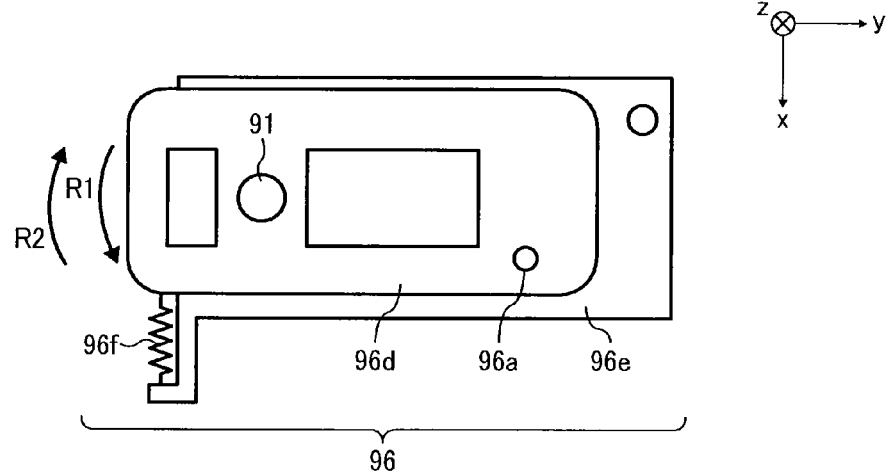
FIG. 11 is a schematic diagram illustrating another example of a related-art belt tracking system including an elastic member.
Figure 12:
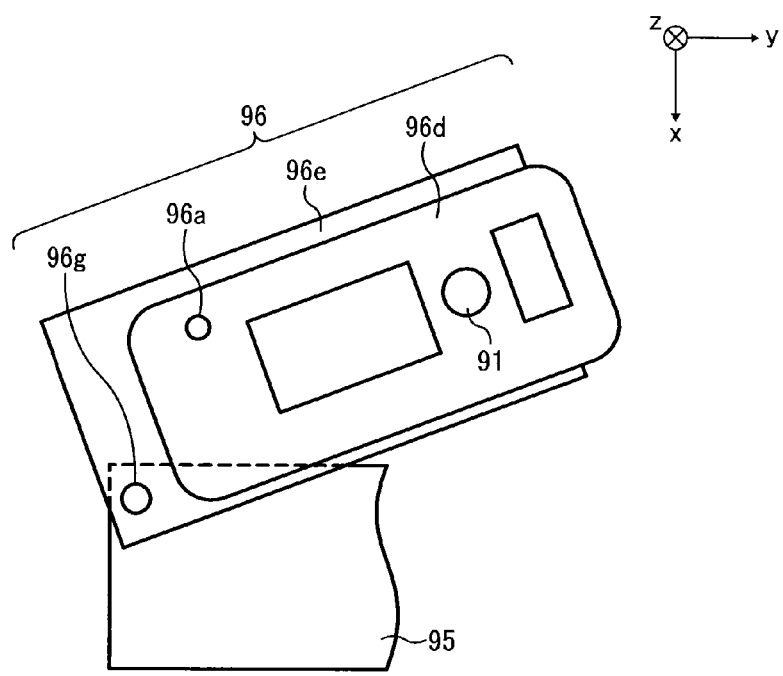
FIG. 12 is a schematic diagram illustrating the related-art belt tracking system after the roller shaft support is rotated.
Figure 13:
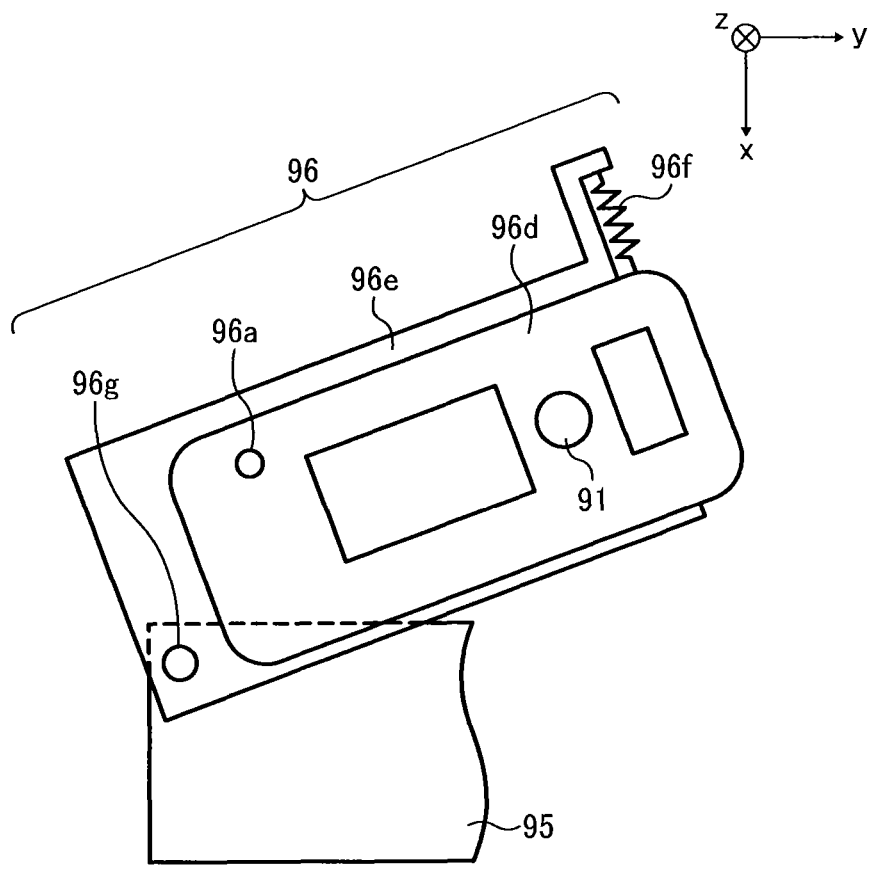
FIG. 13 is a schematic diagram illustrating the related-art belt tracking system with the elastic member after the roller shaft support is rotated.
Figure 14:
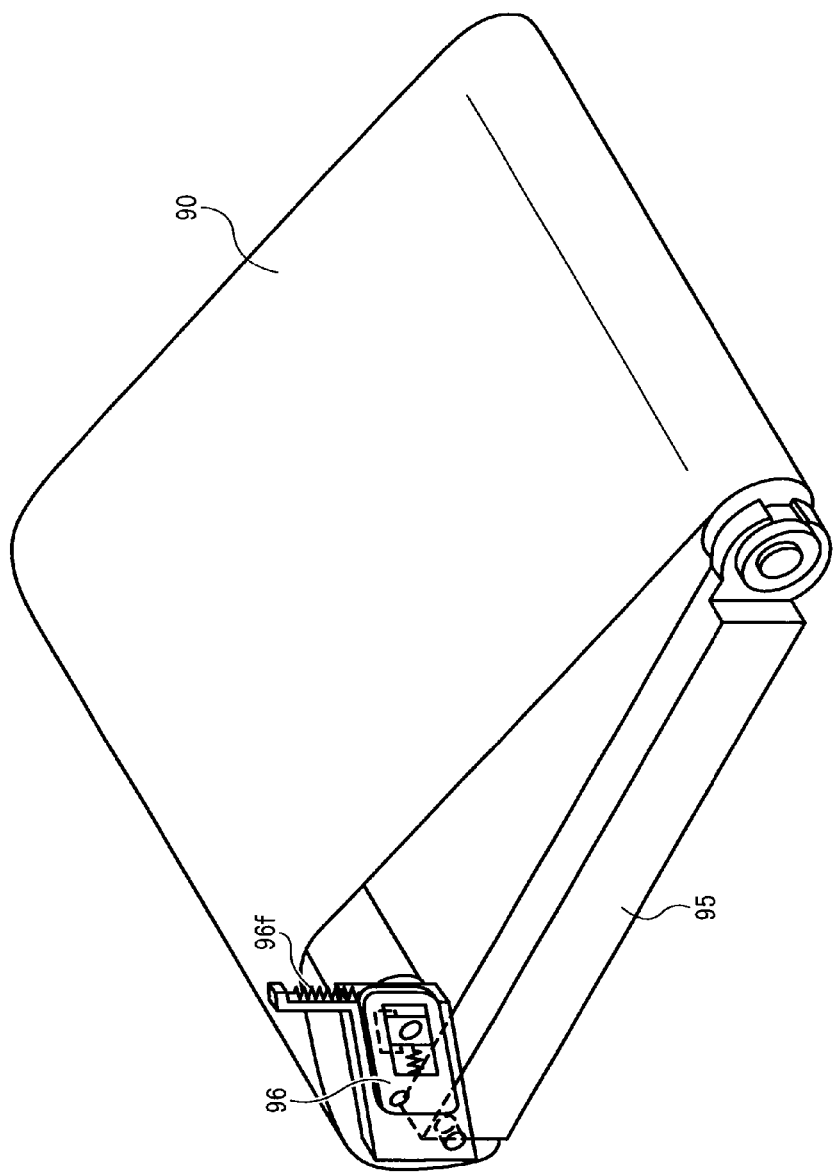
FIG. 14 is a perspective view illustrating the related-art belt tracking system of FIG. 13.

FIGS. 9A and 9B are schematic plan views illustrating the intermediate transfer belt 3 entrained around the tension roller 52 and the support roller 53. As illustrated in FIGS. 9A and 9B, the intermediate transfer belt 3 is entrained around the tension roller 52 and the support roller 53, and the tension roller 52 and the support roller 53 are not parallel. More specifically, in FIG. 9A the tension roller 52 is parallel with respect to a plane of the drawing, and the support roller 53 is tilted such that the left end portion of the support roller 53 is at the proximal side on the plane of the drawing in the axial direction X and the right end side is substantially at a distal side. In a case in which the shaft of the tension roller 52 and the shaft of the support roller 53 are not parallel to each other, causing the intermediate transfer belt 3 to tilt at an angle γ relative to the traveling direction thereof, the intermediate transfer belt 3 moves by a distance Ltan γ in the direction +Z (to the right side in FIGS. 9A and 9B) after the intermediate transfer belt 3 moves by the distance L.

When the intermediate transfer belt 3 shifts in the axial direction and strikes the contact member 30, the slope member 41 moves outward in the axial direction, causing the roller shaft 6 and the tension roller 52 to tilt.

As illustrated in FIG. 2A, when the belt end portion 3a contacts the flat surface 30a of the contact member 30, the contact member 30 moves outward in the axial direction (+Z direction), thereby exerting a force to the slope member 41 outward in the axial direction of the roller. Consequently, as the slope member 41 moves outward in the axial direction of the roller due to the force, the inclined surface 41a contacting the guide surface 42a of the shaft guide 42 shifts upward and tilts as illustrated in FIG. 2B. In accordance with the inclination of the slope member 41, the end portion of the roller shaft 6 penetrating through the slope member 41 moves in the +X direction (the downward direction in FIG. 2B).

As the end portion of the roller shaft 6 moves in the +X direction, the tension roller 52 through which the roller shaft 6 penetrates tilts. FIG. 9B illustrates the inclined tension roller 52 shown in FIG. 2B as viewed from the axial direction X. As illustrated in FIG. 9B, the tension roller 52 is inclined with the left end portion thereof closer to the proximal side than the left end portion in the axial direction X relative to the plane of the drawing. When the degree of inclination of the tension roller 52 is greater than that of the support roller 53, the tension roller 52 and the support roller 53 form an opposite inclination relative to the inclination shown in FIG. 9A. In this case, the intermediate transfer belt 3 moves in the −Z direction (to the left in FIG. 9B), returning to its original position.

More specifically, as illustrated in FIG. 9B, in a case in which the traveling direction of the intermediate transfer belt 3 shifts by an angle γ' as the tension roller 52 is inclined, as the intermediate transfer belt 3 travels a distance of L, the intermediate transfer belt 3 moves by an amount Ltan γ' in the −Z direction, which is the direction opposite to the above-described operation. In other words, the intermediate transfer belt 3 entrained around the tension roller 52 returns inward in the axial direction, returning to its original position.

Because a gap 31b is provided between the tension roller 52 and the belt end support 7 as illustrated in FIG. 2A, even when the tension roller 52 drifts in the axial direction of the roller due to backlash or play, the tension roller 52 and the belt end support 7 remain spaced apart. Accordingly, the tension roller 52 is prevented from forcing the contact member 30 and the slope member 41 outward in the axial direction via the belt end support 7. Only with the force generated by the belt end portion 3a contacting the contact member 30, the roller shaft 6 can be tilted.

In other words, in a case in which the intermediate transfer belt 3 moves outward significantly in the axial direction, the force applied to the contact member 30 by the belt end portion 3a is relatively large, thereby increasing the angle γ' by which the roller shaft 6 is inclined and hence resulting in lengthening the distance Ltan γ' that the intermediate transfer belt 3 travels inward in the axial direction.

By contrast, in a case in which the displacement of the intermediate transfer belt 3 outward in the axial direction is relatively small, the force applied to the contact member 30 by the belt end portion 3a is relatively small, thereby reducing the angle γ' by which the roller shaft 6 is inclined and hence resulting in shortening the distance Ltan γ' that the intermediate transfer belt 3 travels inward in the axial direction. With this configuration, depending on the amount of displacement of the intermediate transfer belt 3 outward in the axial direction, the distance by which the intermediate transfer roller 3 moves inward in the axial direction is determined and hence the alignment of the intermediate transfer belt 3 is corrected properly.

According to the present illustrative embodiment, when the outward force in the axial direction (Z direction) of the roller acts on the slope member 41, hence moving the end portion of the roller shaft 6 in the axial direction X in the image forming apparatus, the roller shaft support 43 rotates about the hinge or pivot 43a in the first direction R1 shown in FIG. 5. With the inclination of the roller shaft support 43, the elastic member 43f is stretched. With the stretch of the elastic member 43f, the resultant elastic force, which opposes the change in length of the elastic member 43f, causes the roller shaft support 43 to rotate backward in the second direction R2 opposite the first direction R1 around the hinge or pivot 43a. As a result, the roller shaft 6 surrounded by the roller shaft support 43 moves upward. The slope member 41 does not separate from the shaft guide 42 under its own weight and the inclined surface 41a of the slope member 41 remains in contact with the guide surface 42a of the shaft guide 42.

With reference to FIGS. 5 through 8 a description is provided of movement of the roller shaft support 43 upon installation and detachment of the roller shaft support 43 relative to the image forming apparatus 100.

When removing the screw that fastens the second plate 43e to the lateral plate 55 in the state shown in FIGS. 5 and 6, the roller shaft support 43 rotates about the rotary shaft 43g. Because the elastic member 43f is disposed on the lateral surface of the roller shaft support 43 in the direction of rotation thereof, rotation of the roller shaft support 43 causes the elastic member 43f to move to the inside of the roller unit. Accordingly, in a state in which the roller shaft support 43 is rotated as illustrated in FIG. 8, the closed curve with the shortest circumference (the closed curve 1 in FIG. 8) among the closed curves within which all devices of the roller unit are included is shorter than the inner circumferential length of the intermediate transfer belt 3 so that it does not hinder attachment and detachment of the intermediate transfer belt 3.

According to the present illustrative embodiment, since the elastic member 43f is disposed on the lateral surface of the roller shaft support 43 in the direction of rotation thereof, the intermediate transfer belt 3 is prevented from getting caught by parts in the belt tracking system 50 when the roller shaft support 43 rotates upon installation and detachment of the intermediate transfer belt 3.

Furthermore, because the elastic member 43f is disposed such that the direction of stretch and compression is horizontal, the elastic member 43f is prevented from contacting other parts in the image forming apparatus 100, thereby allowing reliable rotation of the roller shaft support 43.

According to the present illustrative embodiment, the roller shaft support 43 includes the elastic member 43f. In a case in which some parts are disposed outside the roller shaft support 43, providing the elastic member 43f on the lateral side of the roller shaft support 43 in the direction of rotation can prevent the intermediate transfer belt 3 from getting caught upon installation and detachment of the intermediate transfer belt 3.

In addition to the tension roller 52, the belt tracking system 50 may be provided to the end portions of two or more rollers such as the drive roller 51, and the support rollers 53 and 54.

In the present illustrative embodiment, the rollers other than the tension roller 52, such as the drive roller 51, the support roller 53, and the support roller 54 in the belt unit do not apply tension to the intermediate transfer belt 3. Thus, the tension roller adjuster 43b and the elastic member 43c are not necessary.

According to the illustrative embodiments, the inclined surface 41a of the slope member 41 is disposed above the shaft of the tension roller 52 and slopes down toward the roller shaft 6. In other words, the inclined surface 41a slopes down outward in the axial direction Z relative to the parallel plane of the belt surface. Alternatively, the inclined surface 41a may be disposed substantially below the roller shaft 6 of the tension roller 52 and slopes up toward the roller shaft 6 or slopes up outward in the axial direction Z relative to the parallel plane of the belt surface.

According to the illustrative embodiment, when the intermediate transfer belt 3 moves in its traveling direction with the belt end portion 3a contacting the flat surface 30a of the contact member 30, the contact member 30 gets rotated in association with the movement of the intermediate transfer belt 3 due to frictional force between the belt end portion 3a and the flat surface 30a. With this configuration, the load acting on the belt end portion 3a due to the frictional force is reduced, thereby preventing damage or wear and tear of the intermediate transfer belt 3 and the flat surface 30a.

According to an aspect of this disclosure, the present invention is employed in the image forming apparatus. The image forming apparatus includes, but is not limited to, an electrophotographic image forming apparatus, a copier, a printer, a facsimile machine, and a digital multi-functional system.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. A belt tracking system for adjusting displacement of a movable belt in an axial direction of a plurality of rollers about which the movable belt is entrained, the belt tracking system comprising:
    a slope member disposed at least at one end of at least one of the plurality of rollers in the axial direction, to tilt the roller due to movement of the belt; and
    a roller shaft support to rotate about a predetermined shaft, the roller shaft support including a shaft recovery member to recover a tilt of the slope member,
    the shaft recovery member being disposed within a shortest circumference of a closed curve within which all members of a roller unit including the slope member and the roller shaft support are disposed in a state in which the roller shaft support is rotated.

2. The belt tracking system according to claim 1, wherein the roller shaft support includes a roller guide to support a shaft of the roller and to position the shaft of the roller in place in a state in which the roller shaft support is rotated.

3. The belt tracking system according to claim 1, wherein the shaft recovery member is an elastic member.

4. The belt tracking system according to claim 3, wherein the elastic member is a spring.

5. The belt tracking system according to claim 3, wherein the elastic member stretches and compresses in a horizontal direction.

6. The belt tracking system according to claim 1, wherein the shortest circumference of the closed curve in a state in which the roller shaft support is rotated is shorter than an inner circumference of the movable belt.

7. A roller assembly for moving a movable belt, comprising:
- a plurality of rollers about which the belt is entrained;
- a slope member disposed at least at one end of at least one of the plurality of rollers in the axial direction, to tilt the roller due to movement of the belt; and
- a roller shaft support to rotate about a predetermined shaft, the roller shaft support including a shaft recovery member to recover a tilt of the slope member,
- the shaft recovery member being disposed within a shortest circumference of a closed curve within which all members of a roller unit including the slope member and the roller shaft support are disposed in a state in which the roller shaft support is rotated.

8. An image forming apparatus, comprising:
- at least one of the belt tracking system according to claim 1 and a roller assembly for moving a movable belt, comprising:
- a plurality of rollers about which the belt is entrained;
- a slope member disposed at least at one end of at least one of the plurality of rollers in the axial direction, to tilt the roller due to movement of the belt; and
- a roller shaft support to rotate about a predetermined shaft, the roller shaft support including a shaft recovery member to recover a tilt of the slope member,
- the shaft recovery member being disposed within a shortest circumference of a closed curve within which all members of a roller unit including the slope member and the roller shaft support are disposed in a state in which the roller shaft support is rotated.

* * * * *